United States Patent
Hood (10) Patent No.: US 10,995,763 B1
(45) Date of Patent: May 4, 2021

(54) DYNAMIC SEAL

(71) Applicant: Justin Hood, Longview, TX (US)

(72) Inventor: Justin Hood, Longview, TX (US)

(*) Notice: Subject to any disclaimer, the term of this patent is extended or adjusted under 35 U.S.C. 154(b) by 0 days.

(21) Appl. No.: 16/757,322

(22) PCT Filed: Nov. 22, 2019

(86) PCT No.: PCT/US2019/062772
§ 371 (c)(1),
(2) Date: Apr. 17, 2020

(51) Int. Cl.
*F16J 15/3204* (2016.01)
*F16J 15/34* (2006.01)
*F04D 29/10* (2006.01)

(52) U.S. Cl.
CPC ........ *F04D 29/102* (2013.01); *F16J 15/3204* (2013.01); *F16J 15/348* (2013.01); *F05D 2240/55* (2013.01)

(58) Field of Classification Search
CPC .. F16J 15/3204; F16J 15/3208; F16J 15/3212; F16J 15/348; F16J 15/3484; F04D 29/10; F04D 29/102; F04D 29/104; F04D 29/106; F04D 29/108; F05D 2240/55
USPC .................................................. 417/423.11
See application file for complete search history.

(56) References Cited

U.S. PATENT DOCUMENTS

| | | | | |
|---|---|---|---|---|
| 3,158,295 | A * | 11/1964 | McConaghy | F04D 1/063 222/333 |
| 5,312,225 | A * | 5/1994 | Lorenzen | F04D 29/058 415/105 |
| 2005/0158195 | A1* | 7/2005 | Peterson, Jr. | F04D 29/106 417/423.11 |
| 2007/0224036 | A1* | 9/2007 | Yandle, II | F16J 15/348 415/170.1 |
| 2015/0354583 | A1* | 12/2015 | Postuchow | F04D 29/146 415/113 |
| 2016/0145980 | A1* | 5/2016 | Cunningham | F04B 17/03 417/423.3 |
| 2017/0241428 | A1* | 8/2017 | Ye | F16J 15/3284 |
| 2017/0254341 | A1* | 9/2017 | Bertoneri | F04D 17/10 |
| 2018/0347583 | A1* | 12/2018 | Matsueda | F04D 29/4226 |

FOREIGN PATENT DOCUMENTS

CN            206290448 U     6/2017

\* cited by examiner

*Primary Examiner* — Nathan Cumar (57) ABSTRACT

Disclosed herein are aspects of a sealing device, as well as a pump using the same. In one embodiment, the sealing device includes an axial sleeve having a first end and a second end, a dynamic seal mounted about the first end of the axial sleeve, the dynamic seal including at least one dynamic seal assembly, each of the at least one dynamic seal assemblies including a diffuser and a static steal mounted about the second end of the axial sleeve, and a fixed cartridge housing enclosing at least a portion of the axial sleeve, and an entirety of the dynamic seal and static seal.

24 Claims, 5 Drawing Sheets

DYNAMIC SEAL

CROSS-REFERENCE TO RELATED APPLICATION

This application is the National Stage of, and therefore claims the benefit of, International Application No. PCT/US2019/062772 filed on Nov. 22, 2019, entitled "DYNAMIC SEAL". The above application is commonly assigned with this National Stage application and is incorporated herein by reference in its entirety.

TECHNICAL FIELD

This application is directed, in general, to dynamic seals and, more specifically, to a dynamic sealing device contained within a cartridge housing for installation as a single unit.

BACKGROUND

Fluidic Seals are required in a wide variety of industries and applications. Most rotating equipment inherently have a leak path for pressurized fluid, as a result such seals are often necessary to prevent leakage. For example, seals are important in refineries to prevent leakage of fluids and chemicals, among a variety of other uses in a variety of different applications.

Seals have been used in a wide variety of industries to retain or separate fluids, keep out contaminants, and contain pressure. Notwithstanding, mechanical seals are the most prominently used seals, but unfortunately are prone to failure and leaks. The likelihood of premature failure increases when mechanical seals are in severe services such as ones prone to elevated process temperatures, dry run, and cavitation. Moreover, mechanical seals generally have a limited useful life before needing to be replaced.

Rotary dynamic shaft seals have also been used in a wide variety of industries to retain or separate fluids, keep out contaminants, and contain pressure. Today's rotary dynamic seals require complicated in-field assembly of several components and may generally be costly to install and maintain. What is needed, is a rotary dynamic seal that is cost effective, easy to install in the field and does not experience the drawbacks of exiting mechanical seals.

BRIEF DESCRIPTION

Reference is now made to the following descriptions taken in conjunction with the accompanying drawings, in which.

DETAILED DESCRIPTION

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described. The description and drawings included herein merely illustrate the principles of the disclosure. It will thus be appreciated that those skilled in the art will be able to devise various arrangements that, although not explicitly described or shown herein, embody the principles of the disclosure and are included within its scope.

Traditional dynamic seals generally include multiple components which require detailed, multi-step installation about a shaft in an industrial or environmental setting. Generally, each traditional dynamic seal may be customized for their intended installation location, including customization of seal size and may contain only one seal assembly (also referred to as a seal stage). Such customization can be costly and further, requires a detailed, part-by-part assembly and installation, which is often performed by the original equipment manufacturer.

Disclosed herein are embodiments of dynamic seals and dynamic sealing devices which may be contained within a single unit, such as a cartridge housing, for simpler installation and lower cost installation and maintenance than traditional dynamic seals. The sealing devices according to the disclosure may be sized and designed to fit a large number of installation target sizes. For example, various petroleum and industrial pumps may have standard sizing for their pumps and shafts. The sealing devices according to the disclosure may be customized to fit and be installed on a mass number of pump and shaft diameter sizes, including centrifugal pumps, mixers, compressors, and a wide variety of industrial equipment which may benefit from a dynamic seal. The sealing devices according to the disclosure may consequently be sold and installed as a single, in-tact unit, contained in a fixed cartridge housing and may therefore be easier and cheaper to install relative to traditional dynamic seals.

Figure 1:
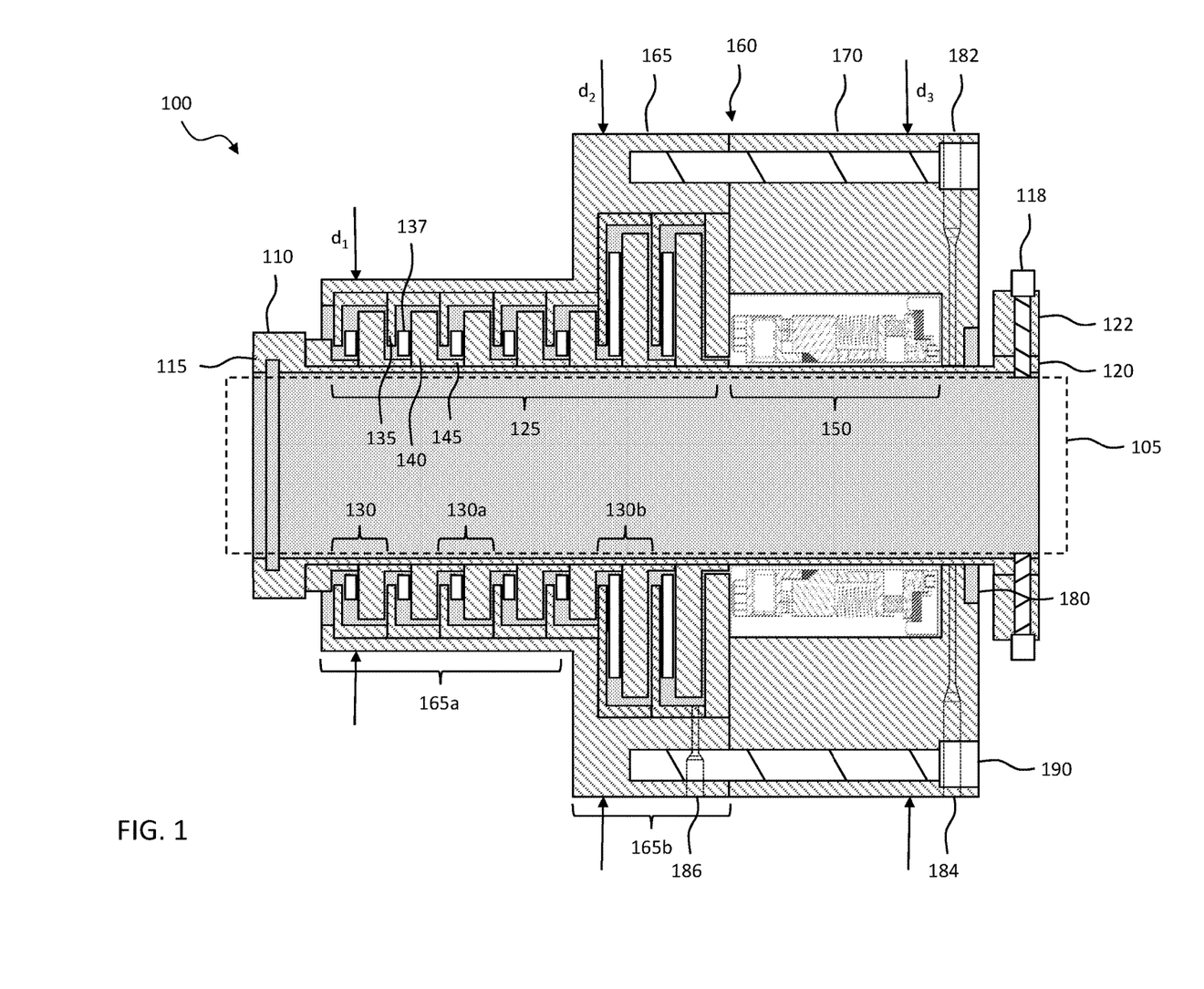
FIG. 1 illustrates a section view of one embodiment of a dynamic seal according to principles of the disclosure.

Referring now to FIG. 1 there is shown a cross-sectional view of a sealing device 100 according to principles the disclosure. Such a sealing device 100 may be used about a rotating shaft that protrudes thru a stationary pressurized vessel, with the intent to prevent or eliminate leakage of the pressurized fluid both when the shaft is stationary and when it rotates, among other purposes. In the illustrated embodiment of FIG. 1, the sealing device 100 may be placed about a shaft 105, which may be installed in an industrial setting such as, in one embodiment, a high temperature bottom pump in a petroleum refinery. The sealing device 100 includes an axial sleeve 110 having a first end 115 and a second end 120. In some embodiments, the axial sleeve 110 may be secured about the shaft 105 via a plurality of radial fasteners 118, which may be bolts, threaded fasteners, or other suitable fasteners for securing the axial sleeve 110 about the shaft 105. The radial fasteners 118, in this scenario, extend through a portion of the axial sleeve 110 to rotationally fix the axial sleeve 110 to the shaft 105 extending there through.

The sealing device 100, according to the disclosure, includes a dynamic seal 125 mounted about the first end 115 of the axial sleeve 110. In one embodiment, the dynamic seal 125 may include one or more dynamic seal assemblies 130, which in some embodiments may be called seal stages. In many embodiments, the dynamic seal 125 will include two or more dynamic seal assemblies 130. In accordance with this embodiment, the two or more dynamic seal assemblies 130 may be mounted in series about the axial sleeve 110, as shown in FIG. 1. Each dynamic seal assembly 130, in the illustrated embodiment, may include a diffuser 135 and an expeller 140. An expeller is often also referred to in the industry as an impeller or repeller, and for the purpose of the instant disclosure is considered one and the same. The diffuser 135 is a component or part whose intent is to stop or reduce the tangential velocity of the fluid, for example using one or more associated blades 137. Further to this embodiment, a spacer 145 may be positioned between the diffuser 135 and the expeller 140. The expellers 140 may be configured as fully open, semi-open, or shrouded, among other configurations.

The sealing device 100 according to the disclosure, additionally includes a static steal 150 mounted about the second end 120 of the axial sleeve 110. In one embodiment, the static seal 150 may be a single or multi-lip seal (see, for example FIG. 4). In another embodiment, the static seal 150 is a packing seal or mechanical seal, such as shown in FIG. 1. In another embodiment, the static seal 150 is a magnetic isolator. Nevertheless, many different static seals 150 capable of providing back-up sealing while the shaft 105 is not rotating, are within the scope of the present disclosure.

In the embodiment of FIG. 1, positioned about the axial sleeve 110, the dynamic seal 125 and the static seal 150 is a fixed cartridge housing 160. The fixed cartridge housing 160, in the illustrated embodiment of FIG. 1, includes two separate bodies, including a first body 165 and second body 170. The two separate bodies 165, 170, in the illustrated embodiment, form one or more cavities for containing the dynamic seal 125 and the static seal 150. Accordingly, the fixed cartridge housing 160 encloses at least a portion of the axial sleeve 110, and an entirety of the dynamic seal 125 and the static seal 150.

In the illustrated embodiment, the first and second bodies 165, 170 are secured together, for instance using one or more longitudinal fasteners 190. The longitudinal fasteners 190 are illustrated in FIG. 1 as threaded fasteners. Nevertheless, other longitudinal fasteners 190 may be used and remain within the scope of the disclosure. In some embodiments, there may be at least four longitudinal fasteners 190 positioned equal-distance radially about the fixed cartridge housing 160. In yet other embodiments, the first and second bodies 165, 170 are clamped together, or even welded, glued, press-fit, or otherwise fixedly coupled together. In certain embodiment, the first and second bodies 165, 170 may not be separated from one another without destroying the integrity of the sealing device 100.

In the illustrated embodiment of FIG. 1, the first body 165 includes a first portion 165a and a second portion 165b. The first and second portions 165a, 165b may, in certain embodiments, have different outer diameters. For example, in the embodiment of FIG. 1, the first portion 165a has a first minimum outer diameter ($d_1$) and the second portion 165b has a first maximum outer diameter ($d_2$). In this embodiment, the first maximum outer diameter ($d_2$) is greater than the first minimum outer diameter ($d_1$), thereby forming a step up feature. In those embodiments wherein the second portion 165b has a greater diameter than the first portion 165a, the first portion 165a is limited in diameter as to fit within a seal chamber. Accordingly, the first portion 165a may fit within a seal chamber in rotating equipment, including pumps, mixers, compressors and other similar devices.

In the illustrated embodiment of FIG. 1, the second body 170 has a second minimum outer diameter ($d_3$). In accordance with the embodiment of FIG. 1, the second minimum outer diameter ($d_3$) is greater than the first minimum outer diameter ($d_1$) of the first portion 165a of the first body 165. Further to this embodiment, the second minimum outer diameter ($d_3$) is substantially equal to the first maximum outer diameter ($d_2$). The term "substantially equal", as used with regard to this configuration, means that the second minimum outer diameter ($d_3$) differs from the first maximum outer diameter ($d_2$) by less than five percent. In the illustrated embodiment, the second portion 165b of the first body 165 is coupled to the second body 170, and the second minimum outer diameter ($d_3$) is equal to the first maximum outer diameter ($d_2$).

According to the embodiment of FIG. 1, and the different volume cavities formed by the first portion 165a and the second portion 165b, a smaller dynamic seal assembly 130a may be positioned within a cavity formed in the first portion 165a, and a larger dynamic seal assembly 130b may be positioned within a cavity formed in the second portion 165b. For instance, an expeller 140 of the larger dynamic seal assembly 130b might have a greater diameter than an expeller 140 of the smaller dynamic seal assembly 130a. Similarly, a diffuser 135 of the larger dynamic seal assembly 130b might have a greater diameter than a diffuser 135 of the smaller dynamic seal assembly 130a.

In accordance with one embodiment of the disclosure, the dynamic seal 125 includes at least four dynamic seal assemblies 130, and at least two of the four dynamic seal assemblies 130 are positioned within the first portion 165a and at least two other of the four dynamic seal assemblies 130 are positioned within the second portion 165b. In the illustrated embodiment of FIG. 1, the first portion 165a includes five smaller dynamic seal assemblies 130a and the second portion 165b includes two larger dynamic seal assemblies 130b. Nevertheless, different configurations with different numbers of dynamic seal assemblies 130a, 130b, are within the scope of the disclosure.

The sealing device 100, in certain embodiments, may include a bushing 180 positioned in an end of the fixed cartridge housing 160 proximate the static seal 150. The bushing 180 may comprise many different materials and remain within the scope of the disclosure. The sealing device 100, in certain other embodiments, may include one or more injection ports 182 and one or more drain ports 184. In the illustrated embodiment of FIG. 1, the one or more injection ports 182 and one or more drain ports 184 extend through the fixed cartridge housing 160 proximate an end of the fixed cartridge housing 160 near the static seal 150. Accordingly, the one or more injection ports 182 may be one or more inert gas or steam injection ports, and the one or more drain ports 184 may be one or more capture or disposal ports. The sealing device 100, in certain other embodiments, may also include one or more additional ports 186 that extend through the fixed cartridge housing 160 proximate the dynamic seal assembly 125. In one embodiment, the additional ports 186 allow for the injection or removal of fluid within the dynamic seal assembly 125, such as may be the case if the fluid is overly hot or overly pressurized.

Figure 2:
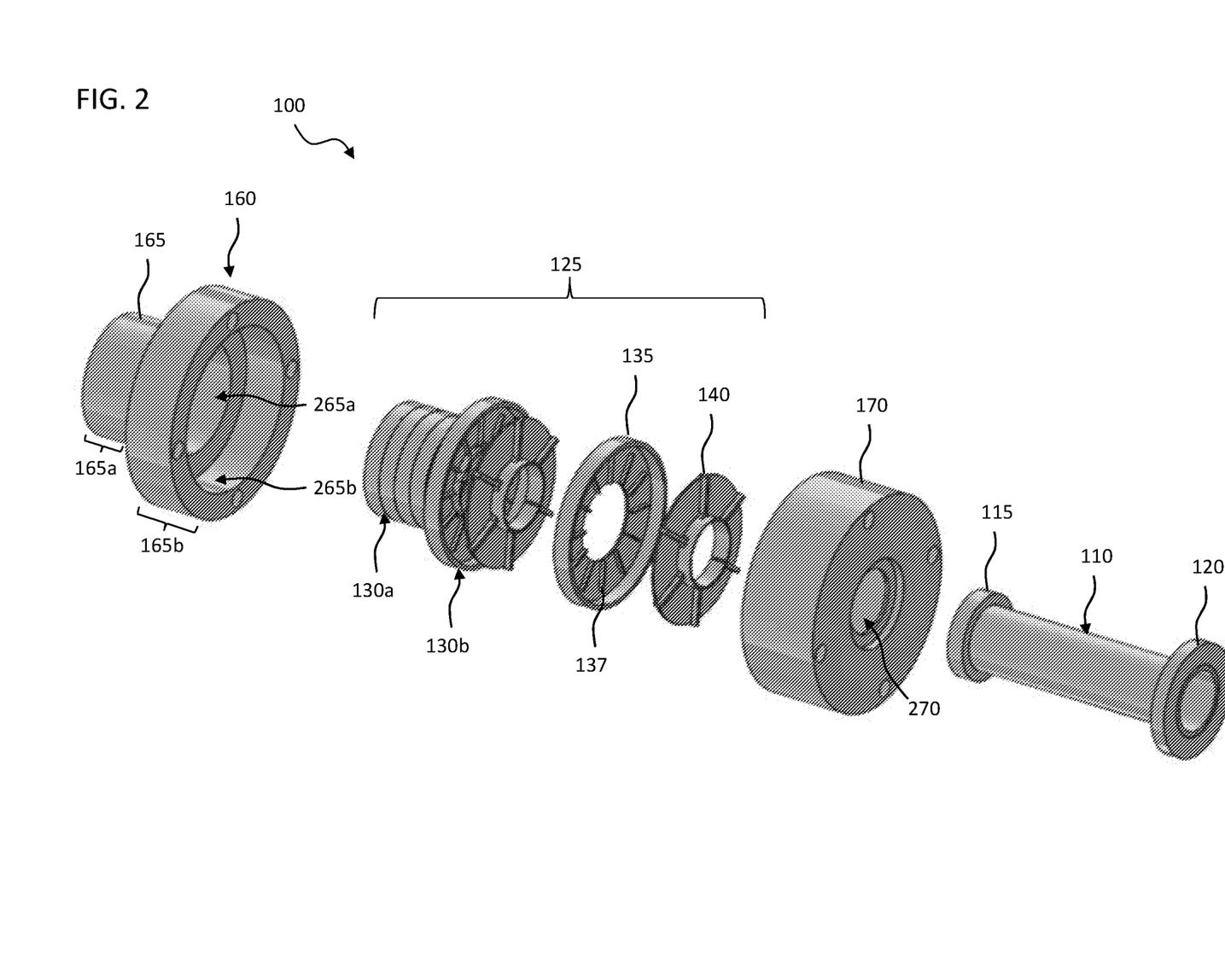
FIG. 2 illustrates an exploded perspective view of the dynamic seal shown in FIG. 1.

Referring now to FIG. 2, illustrated is an isometric exploded view of the various different features of the sealing device 100 illustrated in FIG. 1. In addition to the features illustrated in FIG. 1, cavities 265a, 265b in the first portion 165a and second portion 165b, respectively, are illustrated. Again, according to the embodiment of FIG. 2, the cavity 265b in the second portion 165b has a greater inner diameter than the cavity 265a in the first portion 165a. FIG. 2 additionally illustrates the cavity 270 in second body 170. While not shown, the static seal 150 is positioned in the cavity 270.

Figure 3:
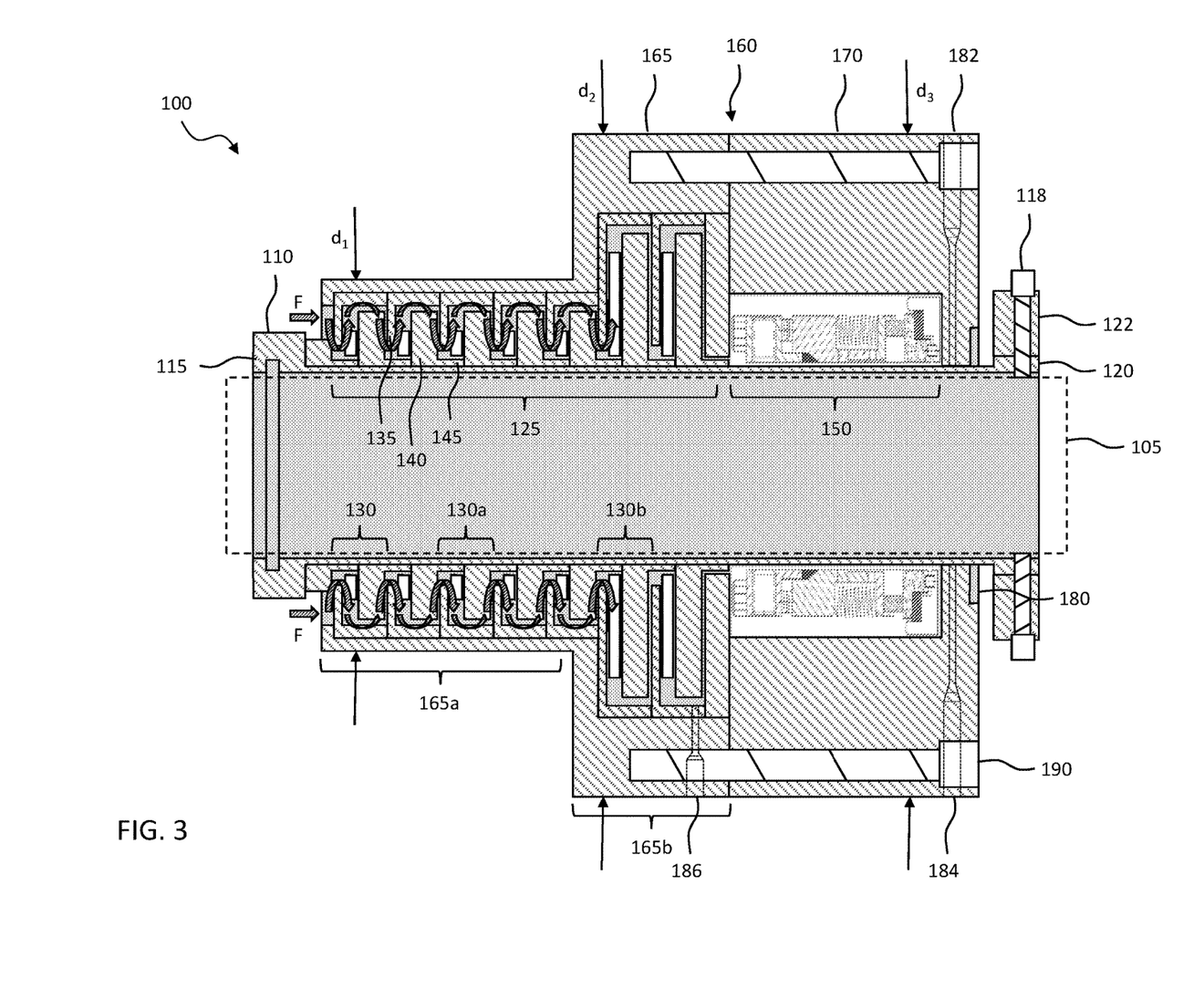
FIG. 3 illustrates a fluid flow within the dynamic seal shown in FIG. 1.

Referring now to FIG. 3, there is shown a cross-sectional view of the sealing device 100 of FIG. 1, with fluid (F) flowing therein. The axial sleeve 110 may couple to a drive collar 122 such that as the shaft 105 rotates, the axial sleeve 110 and components mounted thereabout, including at least the expellers 140 of the dynamic seal assemblies 130, rotate with the shaft 105. As the expellers 140 of the dynamic seal assemblies 130 rotate, centrifugal forces created by the rotating expellers 140 create a seal which counteracts the flow of pressurized fluids. Thus, in operation, the fluid (F) would have a fixed (or variable) initial pressure that it exerts on the front side of the sealing device 100. Similarly, each of the dynamic seal assemblies 130 would be designed to counteract the pressure of the fluid (F) by a certain amount (e.g., psi). Collectively, the dynamic seal assemblies 130 would counteract the fixed (or variable) initial pressure.

As one example, such as shown in FIG. 3, the fluid (F) might impart a pressure of about 15 psi upon the front side of the sealing device 100. In this example, each of the five smaller dynamic seal assemblies 130a are designed to counteract about 2 psi of pressure, and each of the two larger dynamic seal assemblies 130b are designed to counteract about 5 psi of pressure. In this example, the fluid (F) would encounter the first smaller dynamic seal assembly 130a, wherein it would drop from about 15 psi to about 13 psi, would then encounter the second smaller dynamic seal assembly 130a, wherein it would drop from about 13 psi to about 11 psi, would then encounter the third smaller dynamic seal assembly 130a, wherein it would drop from about 11 psi to about 9 psi, would then encounter the fourth smaller dynamic seal assembly 130a, wherein it would drop from about 9 psi to about 7 psi, would then encounter the fifth smaller dynamic seal assembly 130a, wherein it would drop from about 7 psi to about 5 psi, and then would encounter the first larger dynamic seal assembly 130b, wherein it would drop from about 5 psi to about 0 psi. At this state, the sealing device 100 will have achieved its goal, and thus counteracted the flow of the fluid (F). Were the initial fluid (F) pressure to drop, the fluid (F) might only extend to the first, second, third, fourth or fifth of the smaller dynamic seal assemblies 130a, depending on the amount of drop. Were the initial fluid (F) pressure to increase, the fluid (F) might extend to the second of the larger dynamic seal assemblies 130b, depending on the amount of increase.

The dynamic seal 125 only functions well when the shaft 105 is rotating, and thus the aforementioned centrifugal forces are being generated. Accordingly, the sealing device 100 includes the static seal 150 for those situations when the shaft 105 is not rotating. Thus, the static seal 150 provides a back-up seal in the event the shaft 105, axial sleeve 110, and seal assemblies 130 are stationary and not rotating.

The embodiment shown in FIGS. 1-3 may be used in various industrial applications where a desired maximum suction pressure may be about 50 psi and a maximum seal chamber pressure may be about 75 psi, such as, e.g., such as high temperature pumps used in refineries. Nevertheless, those skilled in the art understand that the number of stages (e.g., dynamic seal assemblies 130), and the size and design of the dynamic seal assemblies 130, may be tailored to accommodate many different suction and chamber pressures.

In some embodiments, the sealing device 100 is placed about the shaft 105 and the first end 115 of the axial sleeve 110 and the first end 160 of the fixed cartridge housing 155 may be abutted up to and, in some embodiments, placed into a seal chamber (not shown). However, in some embodiments, the seal chamber may be provided as part of the fixed cartridge housing 155, such as the embodiment shown in FIG. 4 below.

Figure 4:
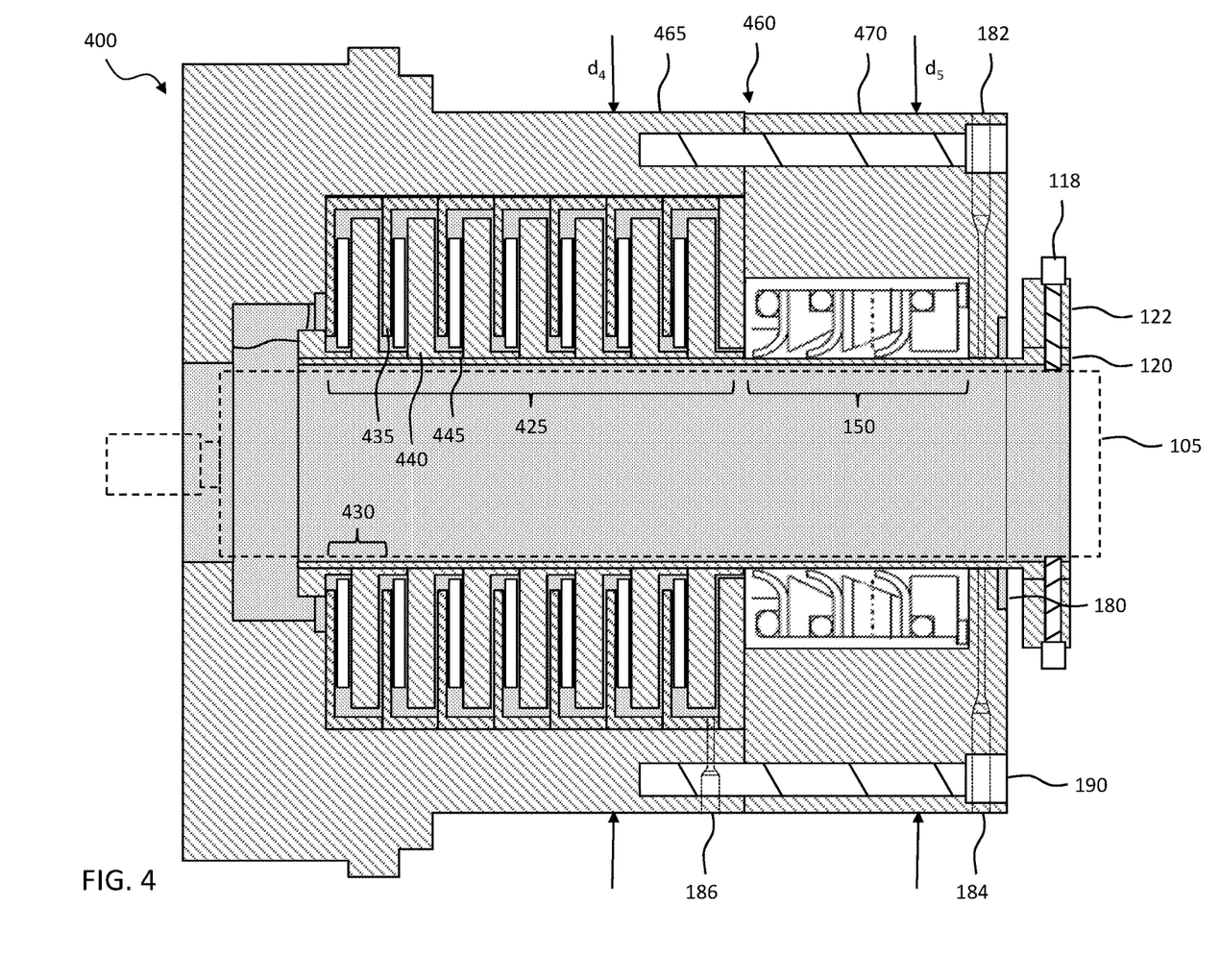
FIG. 4 illustrates a section view of another embodiment of a dynamic seal according to principles of the disclosure.

Referring now to FIG. 4, there is shown a cross-sectional view of another embodiment of a sealing device 400 according to principles of the disclosure. The sealing device 400 is similar in many respects to the sealing device 100 illustrated in FIG. 1. Accordingly, like reference numbers have been used to represent similar, if not identical, features. The sealing device 400 differs, for the most part, from the sealing device 100 in that the first body 465 of the fixed cartridge housing 460 differs in shape from the first body 165 of the fixed cartridge housing 160 of FIG. 1. Specifically, the first body 460 includes only a single portion having a single minimum outer diameter ($d_4$). In this embodiment, the minimum outer diameter ($d_4$) is substantially equal to the minimum outer diameter ($d_5$) of the second body 470.

Further to the embodiment of FIG. 4, the diffusers 435 and expellers 440 of the dynamic seal assemblies 430 of the dynamic seal 425 may have a larger diameter than certain of the diffusers 135 and expellers 140 of the sealing device 100 of FIG. 1. In one embodiment, this is a direct result of the first body 465 having a larger minimum outer diameter ($d_4$). Similarly, in the illustrated embodiment an expeller diameter of each expeller 440 of each of the dynamic seal assemblies 430 is substantially similar. Accordingly, the sealing device 400 of FIG. 4 might be capable of handling greater suction and/or chamber pressures than the sealing device 100 of FIG. 1. Thus, the embodiment shown in FIG. 4 may be used in various industrial applications where a desired maximum suction pressure may be higher. This design could also incorporate the dimensional requirements of the rotating equipment's seal chamber. In this form, the sealing device can withstand higher pressure, further simplifies the design, and reduces the required components needed to assemble the rotating equipment.

Various features of the sealing devices 100 and 400 may comprise both metals and non-metals, and may be fabricated by various manufacturing methods, including casting, injection molding, stamping, and hydroforming. While the embodiments shown herein include a diffuser as part of the dynamic seal assembly, certain embodiments may not include a diffuser.

Figure 5:
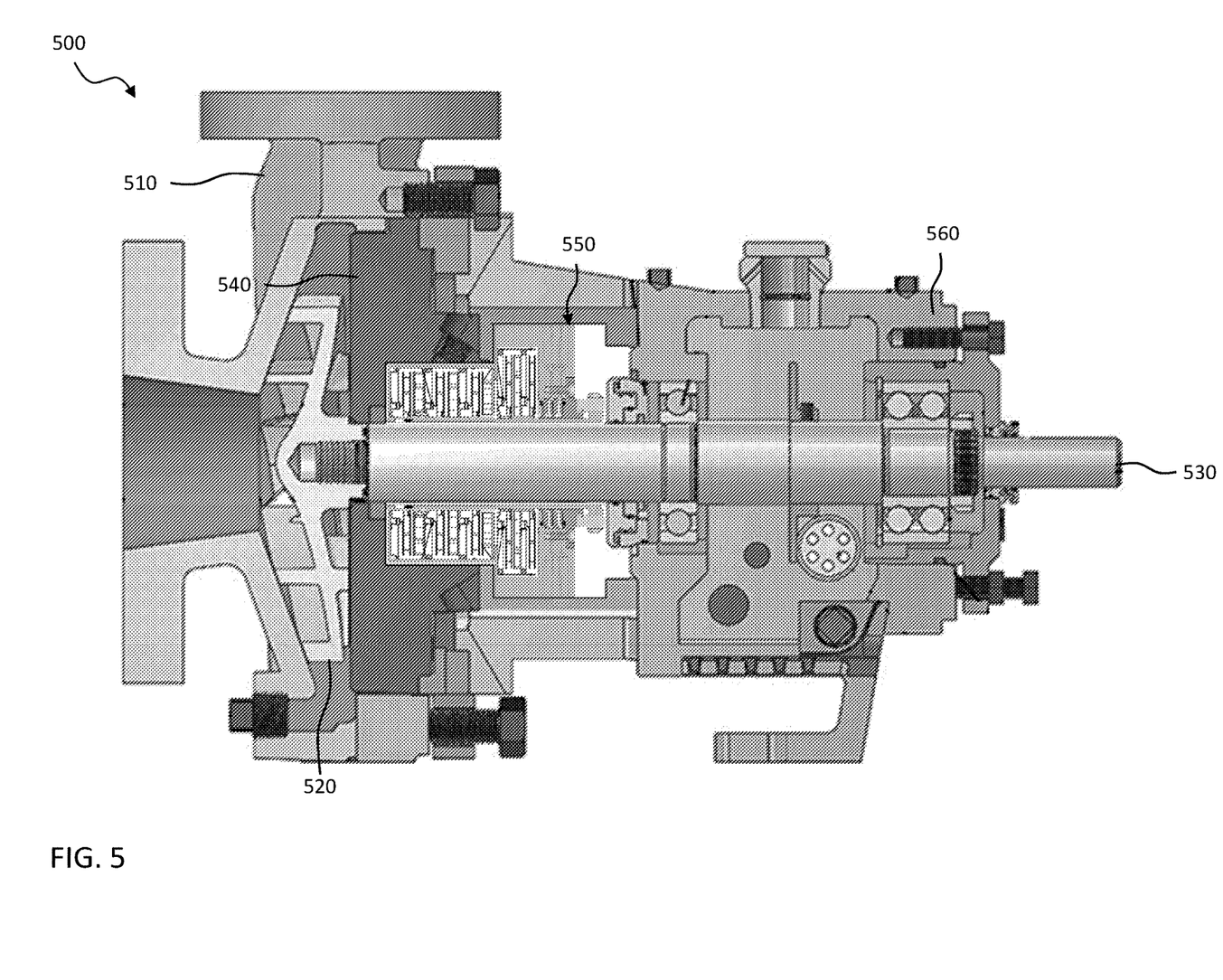
FIG. 5 illustrates a cross-sectional view of one embodiment of a pump designed, manufactured and operated according to the disclosure.

Turning to FIG. 5, illustrated is a cross-sectional view of one embodiment of a pump 500 designed, manufactured and operated according to the disclosure. The pump 500, in the illustrated embodiment, includes a pump housing 510. The pump housing 510, in one embodiment, comprises metal (e.g., steel) or a metal alloy, among other materials. Located within the pump housing 510, in the embodiment shown, is an impeller 520 attached to a shaft 530. The pump 500 according to this embodiment additionally includes a seal chamber 540 located proximate the impeller 520 and within the pump housing 510. The pump 500 according to the disclosure additionally includes a sealing device 550. The sealing device 550 may be any sealing device designed, manufactured and operated according to the disclosure, including the sealing devices illustrated above with regard to FIGS. 1-4. Notwithstanding, other sealing devices according to the disclosure could also be used. The pump 500 illustrated in FIG. 5, additionally includes bearing housing 560 in certain embodiments.

Those skilled in the art to which this application relates will appreciate that other and further additions, deletions, substitutions and modifications may be made to the described embodiments.

The invention claimed is:

1. A sealing device for use about a shaft, the sealing device comprising:
  an axial sleeve having a first end and a second end;
  a dynamic seal mounted about the first end of the axial sleeve, the dynamic seal including at least two dynamic seal assemblies, each dynamic seal assembly including:
    a diffuser; and
    an expeller;
  a static seal mounted about the second end of the axial sleeve; and
  a fixed cartridge housing enclosing at least a portion of the axial sleeve, and an entirety of the dynamic seal and static seal, the fixed cartridge housing including two separate bodies that couple together to form one or more cavities for the dynamic seal and the static seal, wherein a first of the two separate bodies includes a first portion have a first minimum outer diameter and a second portion having a first maximum outer diameter greater than the first minimum outer diameter, and a second of the two separate bodies includes a second minimum outer diameter greater than the first minimum outer diameter and substantially equal to the first maximum outer diameter, wherein the two separate bodies couple together to place the second portion of the first of the two separate bodies proximate the second of the two separate bodies, and wherein a first of the two dynamic seal assemblies is positioned within a first cavity in the first portion and a second of the two dynamic seal assemblies is positioned within a second cavity of the second portion.

2. The sealing device according to claim 1, wherein a first expeller of the first of the two dynamic seal assemblies has a first expeller diameter and a second expeller of the second of the two dynamic seal assemblies has a second greater expeller diameter.

3. The sealing device according to claim 1, wherein the dynamic seal includes at least four dynamic seal assemblies, and further wherein a first two of the at least four dynamic seal assemblies are positioned within the first portion and a second two of the at least four dynamic seal assemblies are positioned within the second portion, and further wherein an expeller diameter of the second two is greater than an expeller diameter of the first two.

4. The sealing device according to claim 1, wherein the first portion is configured to fit within a seal chamber.

5. The sealing device according to claim 1, wherein the dynamic seal is positioned within a first cavity of the first of the two separate bodies and the static seal is positioned within a different cavity of the second of the two separate bodies.

6. The sealing device according to claim 5, wherein the first cavity has a larger volume than the different cavity.

7. The sealing device according to claim 1, further including one or more longitudinal fasteners coupling the two separate bodies together.

8. The sealing device according to claim 1, wherein the static seal is a single or multiple lip seal, packing, or mechanical seal.

9. The sealing device according to claim 1, further including radial fasteners extending through a portion of the axial sleeve, the radial fasteners configured to rotationally fix the axial sleeve to a shaft extending there through.

10. The sealing device according to claim 1, wherein at least one dynamic seal assembly additionally includes a spacer positioned between the diffuser and the expeller.

11. The sealing device according to claim 1, further including a bushing in an end of the fixed cartridge housing proximate the static seal.

12. The sealing device according to claim 1, further including one or more injection ports and one or more drain ports for connecting auxiliary equipment.

13. The sealing device according to claim 12, wherein the one or more injection ports are one or more inert gas or steam injection ports and the one or more drain ports are one or more capture or disposal ports.

14. The sealing device according to claim 1, further including one or more ports extending through the fixed cartridge housing allowing for injection or removal of fluid within the dynamic seal assembly.

15. A pump, comprising:
  a pump housing;
  an impeller attached to a shaft, the impeller and shaft located within the pump housing;
  a seal chamber located proximate the impeller and within the pump housing; and
  a sealing device positioned next to the seal chamber and within the pump housing, the sealing device including;
    an axial sleeve having a first end and a second end;
    a dynamic seal mounted about the first end of the axial sleeve, the dynamic seal including at least one dynamic seal assembly, each dynamic seal assembly including:
      a diffuser; and
      an expeller;
    a static seal mounted about the second end of the axial sleeve; and
    a fixed cartridge housing enclosing at least a portion of the axial sleeve, and an entirety of the dynamic seal and static seal, the fixed cartridge housing including two separate bodies that couple together to form one or more cavities for the dynamic seal and the static seal, wherein a first of the two separate bodies includes a first portion have a first minimum outer diameter and a second portion having a first maximum outer diameter greater than the first minimum outer diameter, and a second of the two separate bodies includes a second minimum outer diameter greater than the first minimum outer diameter and substantially equal to the first maximum outer diameter, wherein the two separate bodies couple together to place the second portion of the first of the two separate bodies proximate the second of the two separate bodies, and wherein a first of the two dynamic seal assemblies is positioned within a first cavity in the first portion and a second of the two dynamic seal assemblies is positioned within a second cavity of the second portion.

16. A sealing device for use about a shaft, the sealing device comprising:

an axial sleeve having a first end and a second end;
a dynamic seal mounted about the first end of the axial sleeve, the dynamic seal including at least two dynamic seal assemblies, each dynamic seal assembly including:
 a diffuser; and
 an expeller;
a static seal mounted about the second end of the axial sleeve; and
 a fixed cartridge housing enclosing at least a portion of the axial sleeve, and an entirety of the dynamic seal and static seal, the fixed cartridge housing including two separate bodies that couple together to form one or more cavities for the dynamic seal and the static seal, wherein a first of the two separate bodies includes a first portion have a first minimum outer diameter and a second portion having a first maximum outer diameter greater than the first minimum outer diameter, and a second of the two separate bodies includes a second minimum outer diameter greater than the first minimum outer diameter, wherein the two separate bodies couple together to place the second portion of the first of the two separate bodies proximate the second of the two separate bodies, and wherein the dynamic seal includes at least four dynamic seal assemblies, and further wherein a first two of the at least four dynamic seal assemblies are positioned within the first portion and a second two of the at least four dynamic seal assemblies are positioned within the second portion, and further wherein an expeller diameter of the second two is greater than an expeller diameter of the first two.

17. The sealing device according to claim 16, further including one or more longitudinal fasteners coupling the two separate bodies together.

18. The sealing device according to claim 16, wherein the static seal is a single or multiple lip seal, packing, or mechanical seal.

19. The sealing device according to claim 16, further including radial fasteners extending through a portion of the axial sleeve, the radial fasteners configured to rotationally fix the axial sleeve to a shaft extending there through.

20. The sealing device according to claim 16, wherein at least one dynamic seal assembly additionally includes a spacer positioned between the diffuser and the expeller.

21. The sealing device according to claim 16, further including a bushing in an end of the fixed cartridge housing proximate the static seal.

22. The sealing device according to claim 16, further including one or more injection ports and one or more drain ports for connecting auxiliary equipment.

23. The sealing device according to claim 22, wherein the one or more injection ports are one or more inert gas or steam injection ports and the one or more drain ports are one or more capture or disposal ports.

24. The sealing device according to claim 16, further including one or more ports extending through the fixed cartridge housing allowing for injection or removal of fluid within the dynamic seal assembly.

* * * * *